Patented Sept. 14, 1937

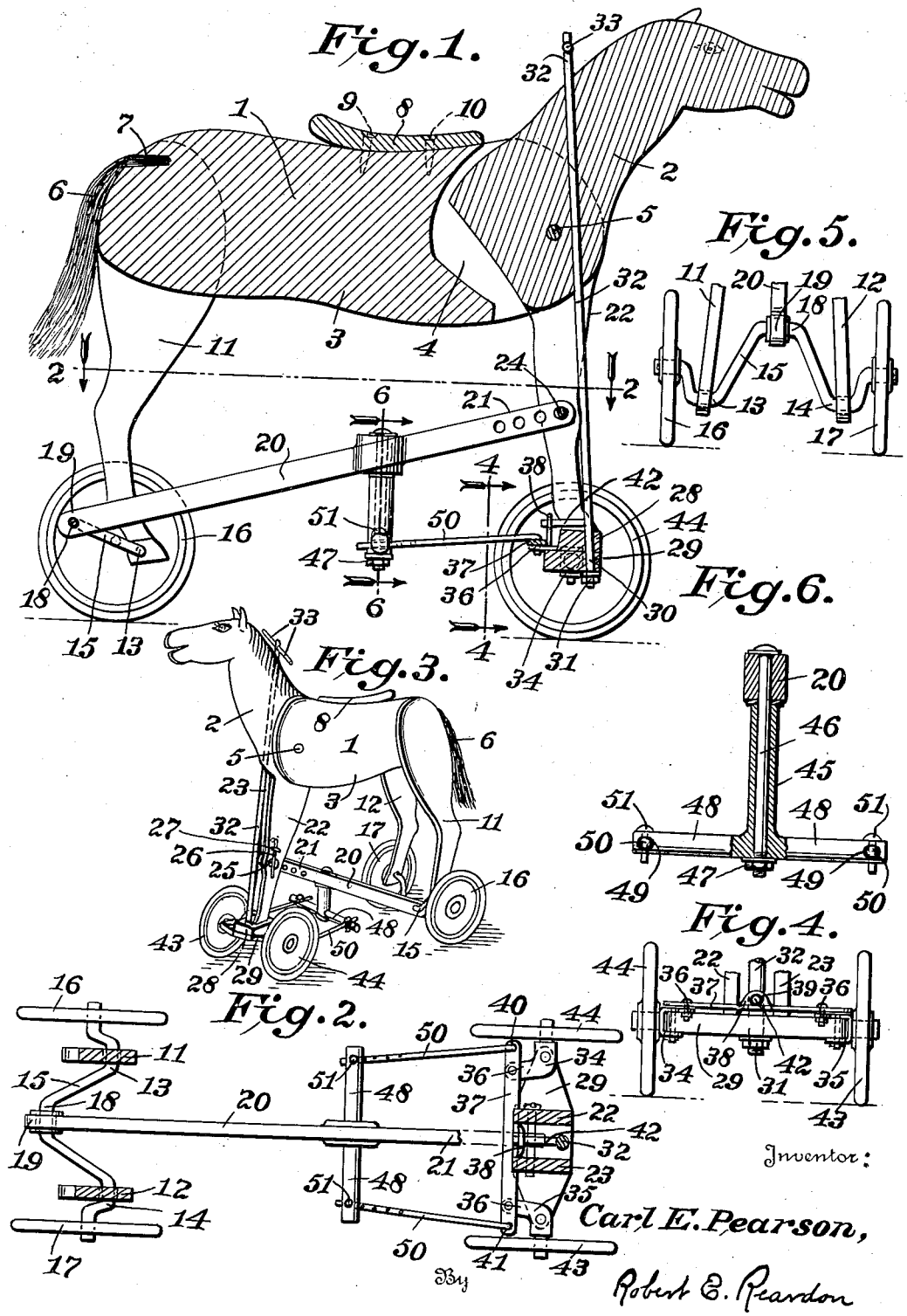

2,092,775

UNITED STATES PATENT OFFICE 2,092,775

PROGRESSIVE HOBBYHORSE

Carl Eric Pearson, Camden, N. J.

Application January 26, 1935, Serial No. 3,656

9 Claims. (Cl. 208—42)

My invention relates to improvements in hobby horses of the progressive type and my object is to provide a hobby horse that gives the rider a smoothly continuous and very realistic simulation of the galloping action of a live saddle horse; one which gives the effect of the easy rise and fall of such motion, in exhilarating and healthful action that utilizes the propulsive power of the rider more fully and effectively than has been possible in prior devices of this type. Even without ball or roller bearings a greater speed can be attained with my device than is practicable with other hobby horses which have such bearings. I provide a hobby horse that is capable of both forward and backward progressive movement; which is adjustable to travel either with or without use of the rider's arms as an aid to motion; which will normally advance in a straight line yet is freely steerable to right or left by either hand or foot action of the rider; and which will not readily tip over while turning. In short, I provide a perfected hobby horse in which I have incorporated all the features desirable and practicable in such a device; thus making it attractive for use by those who know what horseback riding is and producing a means of health giving exercise and recreation for use in private homes, playgrounds, and public amusement parks, roller rinks, etc.
I attain my object by the means illustrated in the accompanying drawing, in which:

Fig. 1 is a side elevation with the body in vertical section.

Fig. 2 is a top plan of the running gear, on line 2—2 of Fig. 1 with forward end of driving bar broken away.

Fig. 3 is a front shoulder perspective of the complete horse.

Fig. 4 is an end elevation of steering gear as from line 4—4 of Fig. 1, minus the tie rods connecting with stirrups.

Fig. 5 is a partial elevation from rear showing crank axle detail.

Fig. 6 is a section of the stirrup member showing its suspension from driving bar.

The main component parts of my hobby horse are few and their assembly simple. As shown herein the horse is mainly constructed of wood. The horse body proper is formed in two parts, the trunk, hind legs and saddle constituting one unit, 1, and the head, chest and forelegs the other unit, 2. The trunk, 3, is vertically recessed centrally, as at 4, to receive the chest portion of the head unit 2 and permit it to move in vertical plane therein, pivoted on a transverse bolt 5.

The head unit 2 thus has a limited rotary movement in vertical plane centrally within the trunk 3. The tail, 6, of the horse may be attached to the trunk by being inserted and glued in a suitable recess in latter, as 7. The saddle, 8, may be glued to the trunk or attached by wood screws, as 9 and 10. The hind legs of the horse, 11 and 12, are suitably mounted pivotally upon side throws, 13 and 14, of a crank shaft, 15, which forms a rear axle that is unitary with two supporting and driving wheels, 16 and 17. Extended centrally of the said crank axle 15 in opposite direction to the side throws 13 and 14 is a center throw 18 on which is mounted pivotally, as by the axle traversing same, the rear end, 19, of a driving or stirrup bar 20, the forward end 21 of which has a series of transverse holes therein and passes between the front legs 22 and 23 of the head unit 2, and is pivotally secured between said legs by a transverse bolt 24 with a slotted head 25. A spring pawl 26 is attached to the horse leg adjacent the bolt-head 25, as by staple 27, and lies across the slotted head 25 to retain the bolt in place while permitting easy removal for adjustment of the driving bar 20 to another position by means of the pivot holes as at 21. The forelegs 22 and 23 terminate in a structurally integral foot block 28, which is mounted on a front axle bar 29 by the lower end 30 of steering rod 32, which is thrust through said axle bar forward of its longitudinal axis and retained by a terminal nut, as 31. The steering rod 32 extends upwardly between and along the forelegs 22 and 23 and through the chest and neck of head unit 2 to terminate above the horse's neck in a cross bar 33 for hand manipulation of the head unit 2 by the rider. On the end of the front axle bar 29 are pivoted steering knuckles 34 and 35 which have arm extensions, as at 36, pivoted to a cross bar 37, which pivotally connects the said knuckles and has midway of its length an upstanding marginal flange 38 with a hole 39 in it opposite the hand steering rod 32. The ends of this cross bar 37 extend laterally beyond their pivotal connection with the arms 36 of the steering knuckles and have transverse holes, as 40 and 41, adjacent their respective ends. Projected from the steering rod 32 is a right angularly extended steering finger 42 which extends into and engages the hole 39 in flange 38 of the cross bar 37, and is thus adapted to swing laterally against either side of said hole 39 and move the cross bar 37 and steering knuckles. Rotatably mounted on the said steering knuckles 34 and 35 are steering and front supporting wheels 43 and 44. Suitably located beneath the saddle section of the horse trunk, there is pendant from the driving bar 20 a stirrup member of inverted T-shape, 45, that has a tubular shank through which a bolt 46 extends vertically downward from and through the driving bar 20, a nut 47 at its lower end securing the stirrup member in freely rotatable position upon the said bolt. Adjacent the outer ends of the stirrup foot extensions 48, are laterally transverse holes 49. Two tie rods, 50, with a series of vertically transverse holes at their rearward end and bent right angularly downward at their forward ends, have their bent ends inserted in the holes 49 and 41 adjacent the terminals of the steering knuckles cross bar 37, thus making pivotal connection with same. The perforated rear ends of these tie rods 50 pass through holes 49 in the stirrup foot extensions 48 which are wide enough to permit lateral movement of the tie rods 50, and are adjustably pivoted in the said holes 49 by vertical pivot pins, as 51, dropped through the stirrup extensions 48, to have sufficient lateral movement to veer the steering wheels when foot pressure swings the stirrup member forward or rearward. It will be noted that the forelegs of the horse being mounted as by pin 30, forward of the longitudinal axis of the front axle 29, are so disposed that the steering axle if free to move laterally and unmally trail behind the forelegs pivot on the end 30 of the steering rod and thus tend to travel in a straight course.

The operation of my hobby horse as shown is a very simple matter. The rider mounts the horse and sits relaxed with his weight upon the saddle 8, his feet resting on the stirrups 48 and his hands grasping the handle bar 33. The crank axle than sets about as indicated in Fig. 5, the weight of the rider on the short throws of the crank axle depressing them so that the long throw of the crank axle sets about 20 degrees forward of the upper dead center. The rider then stands on the stirrups and his weight on the driving bar at once presses down the long throw of the crank axle, rotating it 150 degrees or more to about 10 degrees forward of the lower dead center. The rider then pushes on the handle bar, thus rotating the head and forelegs unit 2 on its pivot 5, depressing the horse's head, pulling back its forelegs, and thrusting back the driving or stirrup bar to swing the crank axle to rising lag, about 10 degrees rearward of the lower dead center. A pull on the handle bar at this instant accompanied by transference of the rider's weight to the saddle, thrusts forward the horse's forelegs, lifts its head, pulls forward on the long throw of the crank axle by means of the stirrup bar and presses down the short throws of the crank axle by the rider's weight, thus swinging the crank axle approximately 190 degrees or more to a complete revolution of the wheels, giving a life-like simulation of the galloping motion of a horse that becomes increasingly realistic and enjoyable as momentum gives flow of motion.

Should it be desired to operate the hobby horse without application of arm force by the rider, this may be effected by a suitable shortening of the wheel base, by moving the adjustable stirrup or driving bar 20 forward between the forelegs of the horse by means of the holes at the forward end 21 of said bar and pivot pin 24, at the same time moving the tie rods 50 back through the holes 49 in the stirrup foot extensions 48, by means of pivot pins 51, to harmonize with the readjustment of driving bar 20. By this shortening of the driving bar 20 the forelegs are drawn back toward the hindlegs so that the throwing of the rider's weight from seat to stirrups overcomes the dead center lag by the forward impetus of the weight transference. It thus becomes unnecessary to aid locomotion by application of arm force to the handle bar. Either forward or backward locomotion is easily effected with the hobby horse, with and without arm force.

I claim:

1. In a hobby horse a body comprised of a head and forelegs unit pivotally mounted in a trunk and hindlegs unit, driving wheel and crank axle means pivotally connected with said hind unit for giving undulative progressive movement to said body, a stirrup bar pivotally connected with said crank axle and the said forelegs unit to rock said forelegs unit, a floating axle attached to the feet of said forelegs unit, supporting wheels upon said floating axle, and hand steering and stirrup steering means connected with said floating axle and supporting wheels for veering said wheels.

2. In a hobby horse a body comprised of a head and forelegs unit pivoted in a trunk and hindlegs unit to have limited rotary movement therein in a vertical plane, a wheel and crank axle pivotally supporting said hind unit and adapted to give undulative progressive movement to said body, a stirrup bar pivotally connecting said crank axle and the forelegs unit to reciprocatively rock the fore unit in the hind unit, a knuckle jointed axle attached to the feet of said fore unit and supporting wheels on said axle, and steering means for veering said wheels.

3. In a hobby horse a body comprised of a head and forelegs unit pivoted in a trunk and hindlegs unit to have limited rotary movement therein in a vertical plane, a supporting wheel and crank axle unit pivotally supporting the said hind unit to give undulative progressive movement to the said body, a stirrup bar pivotally connecting the crank axle and wheel unit with the forelegs unit to reciprocatively move the said forelegs unit in the hindlegs unit, a floating axle pivoted to the feet of the forelegs unit forwardly of the longitudinal axis of said axle, a supporting wheel on said axle, and means for veering said wheel by steering rod or stirrup movement.

4. In a rider operated hobby horse a body comprised of hind and fore units united by a transverse pivot, front and rear supporting wheels, a stirrup bar pivotally attached to said fore unit, a crank axle joining the rear wheels and pivotally supporting said hind unit, a throw on said crank axle that is pivotally attached to said stirrup bar, a veerable supporting wheel attached to the foot of said fore unit, and means for veering the said wheel.

5. In a rider operated hobby horse a body having movable fore and fixed hindlegs, supporting wheels attached to the said fore and hindlegs, a crank axle unitarily connecting the rear wheels, throws on said crank axle, a pivotal connection of said hindlegs with said throws, and an adjustable driving bar with stirrups thereon pivoted at one end to an opposed throw of said crank axle and at the other end pivoted adjustably to said forelegs to vary the length of the base of said supporting wheels.

6. In a rider operated progressive hobby horse

having movable forelegs, front and rear supporting wheels, a crank axle joining the rear wheels, throws on said crank axle, a connection between the hindfeet of the horse and the throws of said crank axle, and a driving bar with stirrups thereon pivoted on a throw of the crank axle and pivoted on the forelegs to move said forelegs to and from the hindlegs.

7. In a rider operated progressive hobby horse having fore and hindlegs and supporting wheels, a front wheel axle, and a vertical pivot connecting said front wheel axle and said forelegs and located on the center line of the axle forward of the longitudinal axis of said axle.

8. In a wheel mounted, rider operated, progressive hobby horse, a driving wheel, a movable head and forelegs unit, a saddle seat and stirrups, and a hand grip on said head and forelegs unit, and means for accomplishing rotation of the driving wheel approximately 190 degrees by application of the rider's weight to the seat, 150 degrees by application of the weight to the stirrups, and 20 degrees by application of the rider's arm force to the hand grip on the head unit.

9. In a wheel mounted, rider operated, progressive hobby horse having a movable head and forelegs unit, a saddle seat, stirrups, and a hand grip on the head and forelegs unit, and adjustable means for varying the wheel base length to permit application of effective propulsive force solely by alternate application of the rider's weight to seat and stirrups, without necessity of applying hand force.

CARL ERIC PEARSON.